US012574218B2

(12) United States Patent
Vittoz et al.

(10) Patent No.: US 12,574,218 B2
(45) Date of Patent: Mar. 10, 2026

(54) SECURING A FILE SYSTEM OF A REMOTE STAND-ALONE SYSTEM

(71) Applicant: THALES, Meudon (FR)

(72) Inventors: Fabien Vittoz, Toulouse (FR); Alexis Pernot, Toulouse (FR)

(73) Assignee: THALES, Meudon (FR)

( * ) Notice: Subject to any disclaimer, the term of this patent is extended or adjusted under 35 U.S.C. 154(b) by 234 days.

(21) Appl. No.: 18/542,654

(22) Filed: Dec. 16, 2023

(65) Prior Publication Data

US 2024/0214184 A1 Jun. 27, 2024

(30) Foreign Application Priority Data

Dec. 21, 2022 (FR) ...................................... 2214050

(51) Int. Cl.
*H04L 9/08* (2006.01)
*G06F 21/57* (2013.01)
*G06F 21/62* (2013.01)

(52) U.S. Cl.
CPC .......... *H04L 9/0825* (2013.01); *G06F 21/575* (2013.01); *G06F 21/6281* (2013.01)

(58) Field of Classification Search
None
See application file for complete search history.

(56) References Cited

U.S. PATENT DOCUMENTS 7,444,349 B1 * 10/2008 Ochotta .............. G06F 16/2343
707/999.102
2014/0298032 A1 * 10/2014 Crowder, Jr. ......... H04L 9/3247
713/176

FOREIGN PATENT DOCUMENTS

CN 108491229 A 9/2018
WO 2016195764 A1 12/2016

OTHER PUBLICATIONS

Pierre-Jean Texier: "Mise a jour d'un systeme Linux embarque < Over The Air >: comment integrer et utiliser <Mender> pour VOS deploiements", Oct. 1, 2018 (Oct. 1, 2018), pp. 1-46.
(Continued)

*Primary Examiner* — William J. Goodchild
(74) *Attorney, Agent, or Firm* — Soquel Group LLC

(57) ABSTRACT

A device for securing a file system of a remote stand-alone system using an operating system associated with the file system having a double partition for A/B updates, the remote stand-alone system being updated by atomic update, and further including a secure boot tool, the device for securing being configured for signing the file system relying on an asymmetric two-key cryptography including a public key and a private key, the public key being integrated into the kernel of the operating system, and the lifetime of the private key being limited, the two public and private keys being regenerated by the device for securing each time a new atomic update of the remote stand-alone system is produced.

10 Claims, 3 Drawing Sheets

(56)              References Cited

OTHER PUBLICATIONS

Berger Stefan et al: "Scalable Attestation: A Step Toward Secure and Trusted Clouds" , 2015 IEEE International Conference on Cloud Engineering, IEEE, Mar. 9, 2015 (Mar. 9, 2015), pp. 185-194.
Elaine Barker, Computer Security Division Information Technology Laboratory, Recommendation for Key Management, National Institute of Standards and Technology Special Publication 800-57 Part 1, Revision 5 Natl. Inst. Stand. Technol. Spec. Publ. 800-57 Part 1 Rev. 5, 170 pages (May 2020).
FR 2214050, INPI Rapport de Recherche Preliminaire, Jun. 8, 2023, 2 pages.

* cited by examiner

SECURING A FILE SYSTEM OF A REMOTE STAND-ALONE SYSTEM

CROSS-REFERENCE TO RELATED APPLICATIONS

This application is a U.S. non-provisional application claiming the benefit of French Application No. 22 14050, filed on Dec. 21, 2022, which is incorporated herein by reference in its entirety.

TECHNICAL FIELD OF THE INVENTION

The present invention relates to a device for securing a file system of a remote stand-alone system, the remote stand-alone system using an operating system associated with the file system of the remote stand-alone system, the remote stand-alone system further using a double file system partition for A/B updates, and the remote stand-alone system further being suitable for being updated by atomic update, the remote stand-alone system further comprising a secure boot tool.

The present invention also relates to such a remote stand-alone system, the remote stand-alone system using an operating system associated with the file system of the remote stand-alone system, the remote stand-alone system further using a double file system partition for A/B updates, and the remote stand-alone system further being capable of being updated by atomic update, the remote stand-alone system further including a secure boot tool.

The invention further relates to a method for securing a file system of such a remote stand-alone system.

The invention further relates to a computer program associated with the method.

BACKGROUND OF THE INVENTION

The invention belongs to the field of stand-alone systems using at least one operating system (OS), e.g., the Linux operating system, and which are administered remotely (Over The Air).

Such remote administration requires the ability to manage atomic updates of such a remote stand-alone system of which system of files also called roots, is, in order to control updates, commonly of the type A/B, i.e., comprising two file systems A and B which are alternately active. Specifically, if the file system A is active then the update will be done on the file system B, and vice versa. Once the update is complete, the system will reboot and switch over to the file system B. If the update is faulty, the system can return to the old version, namely the file system A which is still available. The active file system is read-only and no partial updates are possible, in order to ensure proper operation after an update. Persistent data, e.g., configuration data, are stored on a partition, dedicated if need be, of the media corresponding to the physical storage medium (e.g., hard disk, flash memory, eMMC (Embedded MultiMediaCard), etc.), the media being formatted with a plurality of partitions each containing a file system.

In addition, such an atomic update consists in updating at the same time, both the kernel of the operating system, thereafter called kernel, as well as jointly the file system, on the same partition of the media (i.e., of the remote stand-alone system). Such pair, namely the kernel and the file system, is thus linked, and it is difficult, if not impossible, to update the two elements independently.

Verification of the integrity and authenticity of the files of such a remote stand-alone system, using in particular a Linux operating system, is an imperative for such systems, of which it is necessary to ensure that the binaries that are being executed come from the original software provider and have not been altered.

In general, such remote stand-alone systems further comprise a secure boot hardware tool, however such a tool guarantees the integrity and the authenticity only of the kernel and of the bootloader apt to launch the (or each) operating system, without making possible the verification of the integrity and the authenticity of the elements of the file system.

Currently, verification of the integrity and the authenticity of the file system elements exploits the trust gained in the kernel of the operating system, in particular Linux, through the secure boot tool, in order to be able to use a supplementary software mechanism which generally rests on two types of solutions.

The first solution is based on hash calculations of the blocks of the media partition via a Merkle tree, also called hash tree, suitable for producing a unique hash root used as a reference for the integrity. More precisely, Merkle trees are binary trees used for performing data validation. To this end, each leaf of the tree will contain the cryptographic hash corresponding to a part of the datum to be validated. Each node in the tree will also contain a hash. The hash is obtained by concatenating the hash of the two children and passing the result into a function in order to create a new hash. A general dependency is then built where the value of each node depends on the values of the child nodes thereof in order to obtain, ultimately, a unique hash (hash root). Such unique hash is then integrated into the kernel of the operating system, in particular Linux, and is checked at the boot and dynamically.

However, such first solution is incompatible with the implementation of atomic updates because adding the hash in the kernel inevitably modifies the hash of the sector of the disk containing the kernel and thus makes the unique hash obsolete.

The second solution is based on a verification by signature of the integrity and the authenticity of the files, using e.g., for a Linux operating system, a Linux IMA (Integrity Measurement Architecture) subsystem with the EVM (Extended Verification Module).

Such second solution based on a verification of signature requires the creation of a pair of private/public asymmetric cryptography keys. The private key is used for signing the kernel and the bootloader, whereas the public key is stored on the hardware running the OS, e.g., an iMX6 processor, by burning the hash thereof in the processor. Such burning of the public key is performed using a physical mechanism based on OTP (One Time-Programmable) fuses. Such fuses have the feature that same can only be written only once, but can be read as many times as need be. Thereby, the fuses are used for the secure storage of the public key in the hardware, in an unalterable way.

The second solution has the advantage of being compatible with the implementation of atomic updates because the public key can be added in the kernel without any impact on the calculation of the integrity while making possible the management of atomic updates.

However, in order to make the management of keys simple and industrially secure, such management is complex.

Indeed, in such context, there are different conventional solutions for securing a private key but all of which bring industrial, technical and financial requirements when such mechanism is used for signing a file system.

A first conventional solution for securing the private key requires an interconnection with a public key infrastructure (PKI) for managing keys, but such solution is not very efficient, is complex and expensive to implement, because requiring, e.g., modifying the signature software integrated into the kernel, in particular the open source Linux signature software called "evmctl" which is under specific license "GPLv2" which is not necessarily acceptable industrially. Indeed, such a signature software is not intended for being connected to the PKI, being only intended for working with a local private key.

A second conventional solution for securing the private key involves the use of a local hardware security module (HSM), but requires, like the first solution, also to develop a software layer for interfacing the signature software with the HSM component which moreover involves high costs.

A third conventional solution for securing the private key is based on the use of a local Trusted Platform Module (TPM) for storing the private key, but requires, like the previous solutions, developing a software layer for interfacing the signature software with the TPM component, which moreover adds constraints on the machine used for producing the image of the file system, noting that the use of an asset hardware complicates or even prevents an automated software production on cloud-computing.

A fourth conventional solution is based on the use of a locally self-signed private key, which is efficient and compatible with the implementation of atomic updates of a remote stand-alone system, but requires complex organizational requirements in order to protect, trace, monitor the access or accesses to the private key, such as encrypted disk storage, with a rather relative security and a difficulty in identifying a data leak or in detecting a breach (i.e., hacking) of the private key. Indeed, if the private key is intercepted, the trust in the file system is lost, because the interceptor will have the means to modify the contents while validating the verification with the public key.

SUMMARY OF THE INVENTION

The purpose of the invention is to remedy the drawbacks of the prior art by proposing a simpler and industrially more secure alternative solution, for creating and managing pair (s) of private/public keys dedicated to signature verification.

To this end, the invention proposes a device for securing a file system of a remote stand-alone system, the remote stand-alone system using an operating system associated with the file system of the remote stand-alone system, the remote stand-alone system further using a double file system partition for A/B updates, the remote stand-alone system being further suitable for being updated by atomic update, the remote stand-alone system further comprising a secure boot tool, the device for securing being configured for signing the file system relying on an asymmetric two-key cryptography comprising a public key and a private key, the public key being integrated into the kernel of the operating system, the lifetime of the private key being limited, the two public and private keys being regenerated by the device for securing each time a new atomic update of the remote stand-alone system is produced.

Thereby, the present invention provides a solution for securing the private key in the case of a solution based on a self-signed key in order to preserve a mechanism which is simple to implement rather than going through an external authority for generating the keys.

More precisely, the solution according to the present invention uses a volatile private key in the sense that the lifetime thereof is limited and that the two public and private keys are regenerated by the device for securing each time a new atomic update of the remote stand-alone system is produced. Thereby, the complexity of securing such private key, the need for which is virtually non-existent, because such need is very limited in time, is reduced, and the update of the file system will again go through a complete remote stand-alone system update with a new public/private key pair associated with the production as such of the new update, while the same update can then be distributed to a plurality of separate remote stand-alone systems.

The device for securing for a file system of a remote stand-alone system proposed according to the invention can further have one or a plurality of the features below, taken independently or according to all technically feasible combinations:

the private key is configured for signing the file system once;
the lifetime of the device for securing is also limited;
the device for securing is a Docker container.

A further subject matter of the invention is a stand-alone system using an operating system associated with a file system of the remote stand-alone system.

The remote stand-alone system further uses a double file system partition for A/B updates, and the remote stand-alone system being further suitable for being updated by atomic update, the remote stand-alone system further comprising a secure boot tool, the remote stand-alone system comprising the device for securing according to the present invention as aforementioned.

The remote stand-alone system proposed according to the present invention can also have the feature according to which the operating system is a Linux operating system using the signature mechanism provided by IMA/EVM Linux.

A further subject matter of the invention relates to a method for securing a file system of a remote stand-alone system, the remote stand-alone system using an operating system associated with the file system of the remote stand-alone system, the remote stand-alone system further using a double file system partition for A/B updates, and the remote stand-alone system being further suitable for being updated by atomic update, the remote stand-alone system further comprising a secure boot tool.

The method comprising a phase of signing the file system, relying on a two-key cryptography comprising a public key and a private key, the phase of signing the file system comprising:

generation and integration of the public key into the kernel of the operating system;
generation of a private key for signing the file system, the lifetime of the private key being limited;
signing and securing the file system using the private key with limited lifetime.

The method of securing a file system of a remote stand-alone system proposed according to the invention may further have one or a plurality of the features below, taken independently or according to all technically feasible combinations:

the method further comprises an operation of secure destruction of the private key, the destruction being implemented after the signature;
the destruction is a multi-pass erasure;
the method further comprises, after the signature operation, an operation of storing the private key in an encrypted container the opening key of which is randomly generated without being saved.

A further subject matter of the invention is a computer program including software instructions which, when executed by a computer, implement a method of securing a file system of a remote stand-alone system, as defined hereinabove.

BRIEF DESCRIPTION OF THE DRAWINGS

Other features and advantages of the invention will be clear from the description thereof which is given below as a non-limiting example, with reference to the enclosed figures, among which.

DETAILED DESCRIPTION

Figure 1:
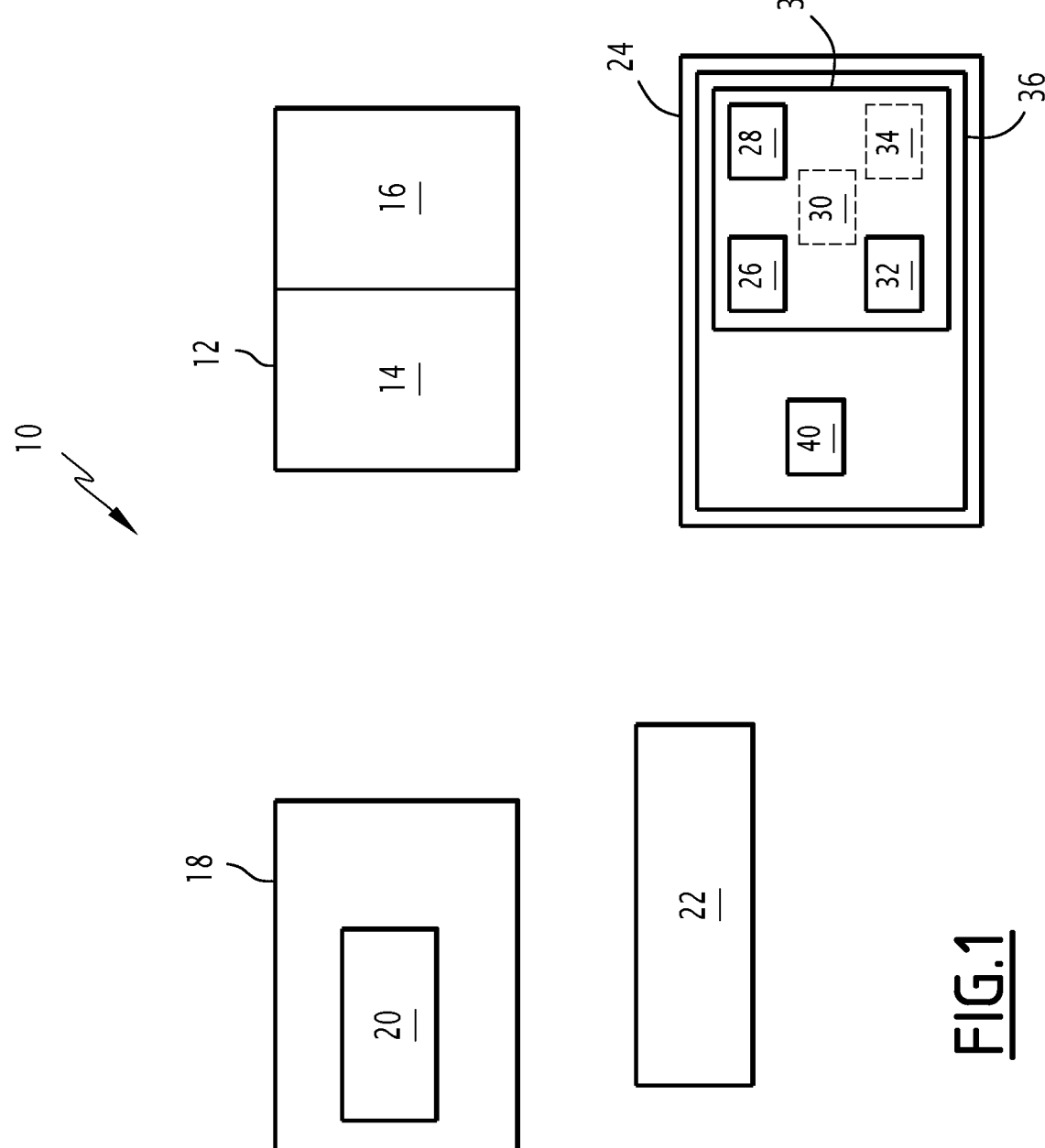
FIG. 1 schematically represents a remote stand-alone system and a device for securing a file system of such a remote stand-alone system according to one embodiment of the invention.

As indicated hereinabove, FIG. 1 schematically represents a remote stand-alone system 10 and a device for securing a file system of such a remote stand-alone system according to an embodiment of the invention.

More precisely, such a remote stand-alone system 10 firstly comprises, and uses, a medium 12, having a double partition such as A 14 and B 16, for A/B updates. Each partition A 14 and B 16 has its own file system.

Moreover, the remote stand-alone system 10 is further suitable for being updated by atomic updating as defined hereinabove.

The remote stand-alone system 10 further comprises and uses at least one operating system 18 the kernel 20 of which is thereafter called a kernel. The operating system 18 is associated with the file system of the remote stand-alone system 10.

As an optional addition, the operating system 18 is a Linux operating system 18 using the signature mechanism provided by IMA/EVM Linux, for compiling the public key with the kernel according to the IMA system and to the EVM of Linux, in order to provide the verification.

The remote stand-alone system 10 further comprises a secure boot tool 22.

According to the present invention, the remote stand-alone system 10 further comprises a device 24 for securing the file system of the remote stand-alone system 10.

The device for securing 24 is configured for signing the file system on the basis on an asymmetric cryptography with two keys comprising a public key and a private key, the public key subsequently being integrated into the kernel 20 of the operating system 18.

According to the present invention, the device for securing 24 is specifically configured for generating a private key, the lifetime of which is limited, the two public and private keys being regenerated by the device for securing 24 each time a new atomic update of the remote stand-alone system 10 is performed (which amounts to a regeneration of the two public and private keys at each production of a version of a remote stand-alone system 10, where N remote stand-alone systems according to such version can be installed, e.g., on N separate machines).

In an advantageous optional addition, the private key is configured for signing the file system once.

In order to sign the file system relying on an asymmetric two-key cryptography comprising a public key and a private key, the device for securing 24 comprises, according to the embodiment of FIG. 1, a first-generation module 26 configured for generating the public key and then integrating it into the kernel 20 of the operating system 18.

In addition, according to the embodiment of FIG. 1, the device for securing 24 further comprises a second-generation module 28 configured for generating the private signature key of the file system, the lifetime of the private key being limited.

According to a variant, the first-generation module 26 and the second-generation module 28 are distinct. According to another variant, the first-generation module 26 and the second-generation module 28 share the same key generation tool configured for directly generating the private key/public key pair.

According to a supplementary optional aspect, the device for securing 24 further comprises an encrypted container 30, represented by dashes, the encrypted container 30 being configured for storing the private key, the opening key of the encrypted container 30 being randomly generated without being saved.

According to the embodiment shown in FIG. 1, the device for securing 24 further comprises a signature module 32 configured for signing and securing the file system by using the private key having a limited lifetime.

According to a supplementary optional aspect, the electronic device for securing 24 further comprises a destruction module 34, represented by dashes, configured for destroying the private key in a secure way, after the key was used for signing and securing the file system. It should be noted that the use of the encrypted container 30 indicated hereinabove makes it possible to avoid the use of the destruction module 34, and vice versa.

According to an optional variant, such an optional destruction module 34 is apt to implement a multi-pass erasure.

Figure 2:
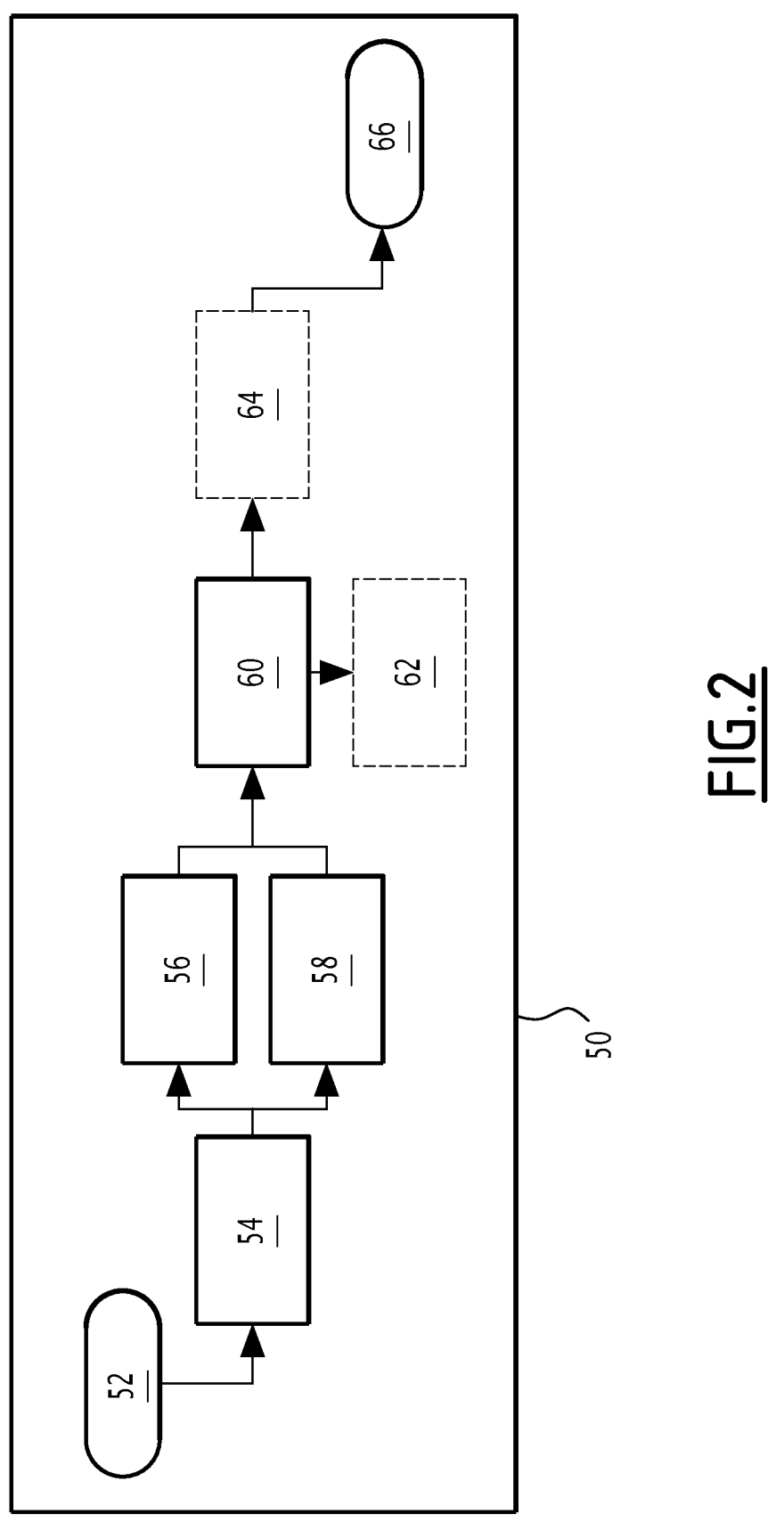
FIG. 2 is an organization chart of the main operations of a method of securing a file system of a remote stand-alone system according to an embodiment of the invention.

Thereby, the electronic device for securing 24 is configured for implementing, at least in part, the method for securing a file system of a remote stand-alone system as discussed in detail thereafter in relation to FIG. 2.

According to an aspect illustrated by FIG. 1, the electronic device for securing 24 comprises an information processing unit 36 consisting, e.g., of a memory 38 and of a processor 40 associated with the memory 38.

According to a particular example, the first-generation module 26, and the second-generation module 28, the signature module 32, and optionally the encrypted container 30 or the destruction module 34 are each produced in the form of a software program, or a software package, executable by the processor 40 of the electronic device for securing 24 according to the present invention. The memory 38 of the electronic device for securing 24 is then apt to store a first software for generating and integrating the public key into the kernel 20 of the operating system 22, a second software for generating a private key for signing the file system, the lifetime of the private key being limited, a software for signing and securing the file system using the private key having a limited lifetime, and optionally an encrypted container software the opening key of which is randomly generated without being saved, or a software for securely destroying the private key after the key was used for signing. The processor 40 is then apt to execute each of the software.

In a variant (not shown), the first-generation module 26, and the second-generation module 28, the signature module 32 and optionally the encrypted container 30 or the destruction module 34 are each produced in the form of a programmable logic component, such as an FPGA (Field Programmable Gate Array), or further in the form of a dedicated integrated circuit, such as an ASIC (Application Specific Integrated Circuit).

When the electronic device for securing 24 is produced in the form of one or a plurality of software programs, i.e., in the form of a computer program, same is further apt for being recorded on a computer-readable medium (not shown). The computer-readable medium is, e.g., a medium apt to store electronic instructions and to be coupled to a bus of a computer system. As an example, the readable medium is an optical disk, a magneto disk, a ROM memory, a RAM memory, any type of non-volatile memory (e.g., EPROM, EEPROM, FLASH, MVRAM), a magnetic card or an optical card. A computer program containing software instructions is then stored on the readable medium.

It should be noted that the device for securing 24 which is used for producing the new system and thus uses the volatile private key according to the present invention, is as such conventionally secured in order to be as such properly protected in order to ensure the protection of the private key, which amounts to prohibiting the use of a device without any protection, without updating, connected to the Internet, and hence vulnerable.

According to a supplementary optional aspect, the lifetime of the device for securing 24 as such, is also limited.

According to another supplementary optional aspect, the device for securing 24 is a Docker container.

An example of the implementation of a method 50 for securing the file system of the remote stand-alone system 10 according to the example of FIG. 1 will henceforth be described hereinafter, in particular in relation to the embodiment shown in FIG. 2, the method 50 comprising a phase of signing the file system, relying on a two-key cryptography comprising a public key and a private key, the phase of signing the file system comprising:

generation and integration of the public key into the kernel of the operating system;

generation of a private key for signing the file system, the lifetime of the private key being limited;

signing and securing the file system using the private key with limited lifetime.

The embodiment shown in FIG. 2 corresponds to an implementation of the method 50, considering that the operating system 18 shown in FIG. 1 is a Linux operating system.

According to such implementation, a packet initialization (not shown) is first implemented. The development of the system as such is then carried out and it is during such development that the method 50 for securing the file system of the remote stand-alone system 10 according to the present invention is implemented.

More precisely, in a conventional manner, an operation 52 of generating the file system is first implemented.

Then, according to the example shown in FIG. 2, the generation of the public key and the generation of the aforementioned private key are implemented simultaneously within the operation 54 of generating a private key/public key pair, the private key being configured for having a limited lifetime (i.e., the private key being volatile).

During the operation 56, the compilation (i.e., integration) of the public key into the kernel 20 is implemented.

In parallel, during the operation 58, the development of the files of the file system is implemented.

Then, according to an operation 60, the signing and securing of the files using the private key having limited duration is performed.

As an optional addition, the method 50 for securing a file system of a remote stand-alone system further comprises an operation 62, represented by dashes, of storing the private key in an encrypted container the opening key of which is randomly generated without being saved.

As an alternative to the optional operation 62, the aforementioned signature operation 60 is followed by an operation 64, also optional, of secure destruction of the private key.

According to an optional aspect, such destruction 64 is implemented by multi-pass erasure (i.e., by multiple passes).

At the end of the operations 52 to 60, optionally with the operations 62 and 64, according to an operation 66, a signed and immutable file system is then obtained.

Thereby, the method 50 according to the present invention is based on the innovative use of a volatile private key, i.e., the key will have a limited lifetime, and according to an advantageous optional aspect, limited to the period of signature of the file system.

A malicious entity who would want to steal the private key will then either have to recover the key on the system after the system is extinguished, which is thereafter qualified as a post-mortem attack, in particular by stealing a hard disk or an installation/execution of malware after the production of the file system, or intercept the key by having previously compromised the system containing the private key, which is thereafter qualified as a dynamic attack, using this time a malware during the execution of the signature step 60 as such.

With regard to post-mortem attacks, as indicated hereinabove, the present invention proposes, in order to protect the invention from such post-mortem attacks, to set up a mechanism for the secure storage 62 and/or secure destruction 64 of the private key.

More precisely, as indicated hereinabove, for the secure storage 62, the present invention proposes to use an encrypted container. In other words, for the security option 62, it is a question of generating and storing the key not "in clear" on the storage medium but inside an encrypted container 30 as represented in FIG. 1, such as a "cryptsetup LUKS" container, "truecrypt" secured, e.g., by an AES-256 encryption.

According to an optional variant for reinforcing the security of such a storage 62, such an encrypted container 30 may be developed and mounted directly in a volatile RAM (Random Access Memory).

In order to develop the encrypted container 30, the security password will be generated randomly and will not be saved, so that in a post-mortem analysis it is hence impossible to find the opening key of the encrypted container 30, and the encrypted container cannot be decrypted with the current means.

For the other secure destruction option 64, such alternative focuses on securing the destruction of the data rather than securing the storage thereof as described according to the option hereinabove.

Depending on the type of equipment used for temporarily storing the private key, the secure destruction 64 corresponds, according to a first variant, already mentioned hereinabove, to a multi-pass erasure, according to which a dedicated software is used for performing an erasure comprising successions of writing either random or non-random data on the old data and then erasures, thereby providing a secure erasure of the data.

According to another variant, as implemented when the hardware used for temporarily storing the private key corresponds, e.g., to one or a plurality of SSDs (Solid State Drives, technology based on flash-memory), in which case the first variant above does not work, the methods of the manufacturers, which offer software dedicated to the hardware thereof of the type, are used for actually erasing the flash memory zones.

With regard to the aforementioned dynamic attacks, in order to reduce the attack surface as much as possible, it is proposed, as indicated above, that the lifetime of the device for securing 24 as such is also limited.

In other words, the device for securing 24 used for signing and for storing the private key is also ephemeral. To this end, it is proposed to use virtualized devices without persistence such as a Docker container corresponding to an open platform for the deployment and the execution of applications and which make possible to embed and to execute an application in a partitioned environment called a container. Unlike virtualization where the virtual machine contains a complete operating system, the associated tools, and the hosted application, such a Docker container contains only the libraries and tools needed for running the application and works directly in the kernel of the host machine. Such a Docker container then amounts to the implementation of an isolation of the computer means during the development, the use and the destruction of the private key, which makes it possible to guarantee the security of the method.

Figure 3:
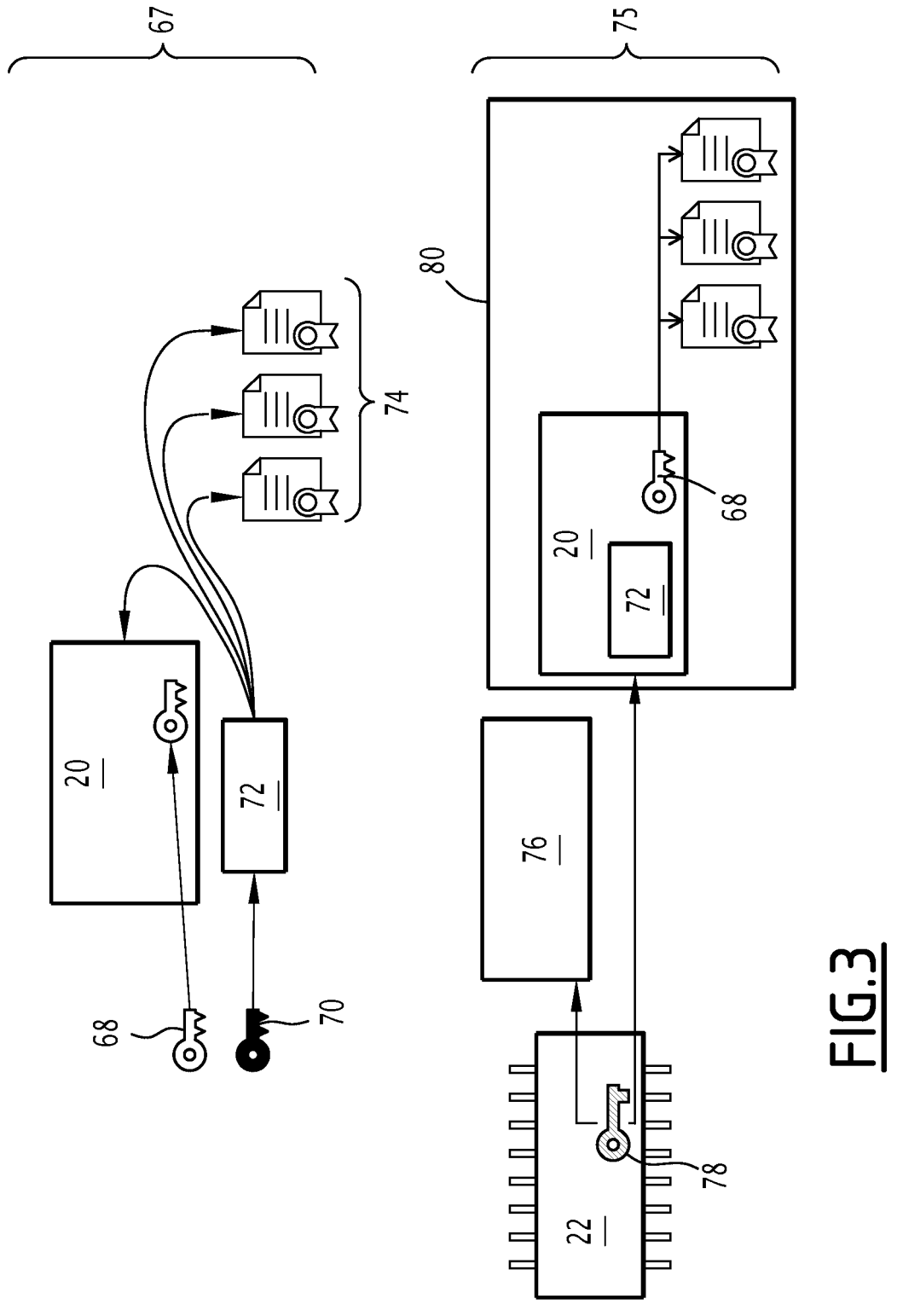
FIG. 3 illustrates the securing effects associated with each operation of the method illustrated by FIG. 2.

FIG. 3 illustrates the securing effects associated with each operation of the method illustrated by FIG. 2.

In FIG. 3, the view 67 corresponds to the software production of the file system. According to the embodiment illustrated in FIG. 3, the public key 68 and the private key 70 are, e.g., generated using an encryption toolbox such as OpenSSL, and the signature tool 72 provided by IMA/EVM Linux is used in particular.

Once the signing operation is completed, a signed and immutable file system 74 is then obtained, and the private key 70 is, according to an option discussed in detail hereinabove, destroyed in a secure way in order to limit the risks of exfiltration of the private key via forensic methods (i.e., based on forensic analysis also called numerical investigation).

For example, the lifetime of the private key 70 is limited to the duration of the software production of the file system, i.e., a few hours, e.g., two or three hours, and as such is used only a few seconds for signing the files in order to obtain, after the key was used, the signed file system 74.

The view 75 shown in FIG. 3 illustrates the execution of the remote stand-alone system 10. During such execution, according to a prerequisite on which the present invention relies, the secure boot tool, illustrated by the reference 22 in FIG. 3, implemented by the hardware of the remote stand-alone system 10, will also conventionally verify the integrity of the bootloader (or BIOS from Basic Input Output System, or yet UEFI from Unified Extensible Firmware Interface) 76 and the kernel 20 via e.g. a ROM (Read Only Memory) code, or an embedded software (firmware), implementing the management of the secure startup tool 22 and using another pair of asymmetric keys, the public key 78 of which is represented in FIG. 3, the keys as such being suitably secured via conventional security by a Public Key Infrastructure (PKI) for managing keys or further via a Hardware Security Module (HSM), etc.

During such execution of the remote stand-alone system 10, in the example shown in FIG. 3, an attacker (i.e., malicious entity) could try to use an attack that would use a new malicious public/private key pair (not shown) and would attempt to re-sign the entire file system with the malicious private key by replacing the public key 68 in the kernel 20 with the malicious public key thereof.

Such an attacker would then advantageously be blocked according to the present invention, because firstly, as indicated hereinabove, the kernel 20 is also controlled by the secure boot tool 22 which implements a supplementary cryptographic verification in particular via the key 78.

In addition, the public key 68, generated during the software production of the view 67 shown in FIG. 3, associated with the file system, is included in the kernel 20 and the whole forms the consistent group 80. But, according to the present invention, it is impossible to modify any file of the consistent group 80 without having the private key 70, generated during the software production of the view 67 shown in FIG. 3 because of the limited lifetime thereof, according to the present invention, (i.e., volatile key), which advantageously no longer exists during the execution of the remote stand-alone system 10 corresponding to the view 75 shown in FIG. 3.

A person skilled in the art would understand that the invention is not limited to the embodiments described, nor to the particular examples of the description, the above-mentioned embodiments and variants being suitable for being combined with one another so as to generate new embodiments of the invention.

The present invention thereby proposes a securing solution for verifying the integrity of a file system, in particular of the Linux type. Such solution based on a volatile private key no longer makes it possible to modify or alter the file system because the private key will no longer exist, which makes it more complex for a malicious person to implement a persistent attack on such type of system.

As mentioned hereinabove, the public key is compiled with the kernel in order to ensure a verification according to the IMA system and to the Linux EVM, the integrity and the authenticity of the kernel being protected by the secure boot hardware tool.

Since the file system update is atomic, adding/modifying/deleting a file requires regenerating the entire file system, which involves generating a new public/private key pair. A new kernel is also compiled by including the new public key.

Thereby, the solution proposed according to the present invention is advantageous because the solution obviates the need to take heavy technical or organizational measures in order to manage the protection of the private key. The association of an atomic update including the file system and the kernel as well as the generation of single signature keys (i.e., single-use for signing the file system once), provides the benefit of a simple and ultra secure solution of the private key to dispense with the constraints related to the management thereof.

The invention claimed is:

1. A device for securing a file system of a remote stand-alone system, the remote stand-alone system using an operating system associated with the file system, the remote stand-alone system further using a dual file system partition for A/B updates, the remote stand-alone system being suitable for being updated by atomic updating, the remote stand-alone system comprising a secure boot tool, the device for securing being configured for signing the file system relying on an asymmetric two-key cryptography comprising a public key and a private key, the public key being integrated into the kernel of the operating system, wherein a lifetime of the private key is limited, the public and private keys being regenerated by the device for securing each time a new atomic update of the remote stand-alone system is produced.

2. The device according to claim 1, wherein the private key is configured for signing the file system once.

3. The device according to claim 1, wherein the lifetime of the device for securing is also limited.

4. The device according to claim 1, wherein the device for securing includes a Docker container.

5. A remote stand-alone system using an operating system associated with a file system of the remote stand-alone system, the remote stand-alone system further using a dual file system partition for A/B updates, the remote stand-alone system being suitable for being updated by atomic updating, the remote stand-alone system comprising:

a secure boot tool; and a device for securing the file system, the device being configured for signing the file system relying on an asymmetric two-key cryptography comprising a public key and a private key, the public key being integrated into the kernel of the operating system, wherein a lifetime of the private key is limited, the public and private keys being regenerated by the device for securing each time a new atomic update of the remote stand-alone system is produced.

6. The system according to claim 5, wherein the operating system is a Linux operating system using a signature mechanism provided by IMA/EVM Linux.

7. A method for securing a file system of a remote stand-alone system, the remote stand-alone system using an operating system associated with the file system, the remote stand-alone system further using a dual file system partition for A/B updates, the remote stand-alone system being suitable for being updated by atomic updating, the remote stand-alone system comprising a secure boot tool, the method comprising a phase of signing the file system, relying on a two-key cryptography comprising a public key and a private key, the phase of signing the file system comprising:

generating and integrating the public key into the kernel of the operating system;

generating a private key for signing the file system, a lifetime of the private key being limited; and signing and securing the file system using the limited lifetime private key.

8. The method according to claim 7 further comprising securely destroying the private key, said securely destroying step being performed after said signing.

9. The method according to claim 8, wherein said securely destroying is a multi-pass erasure.

10. The method according to claim 7, further comprising, after said signing, storing the private key in an encrypted container an opening key of which is randomly generated without being saved.

* * * * *